(12) United States Patent
Tao

(10) Patent No.: US 12,450,928 B2
(45) Date of Patent: Oct. 21, 2025

(54) RESOLUTION-BASED EXTRACTION OF TEXTUAL CONTENT FROM VIDEO OF A COMMUNICATION SESSION

(71) Applicant: Zoom Communications, Inc., San Jose, CA (US)

(72) Inventor: Renjie Tao, Sunnyvale, CA (US)

(73) Assignee: Zoom Communications, Inc., San Jose, CA (US)

( * ) Notice: Subject to any disclaimer, the term of this patent is extended or adjusted under 35 U.S.C. 154(b) by 241 days.

(21) Appl. No.: 17/832,640

(22) Filed: Jun. 4, 2022

(65) Prior Publication Data

US 2023/0394858 A1 Dec. 7, 2023

(51) Int. Cl.
*G06V 30/148* (2022.01)
*G06V 20/40* (2022.01)
*G06V 30/146* (2022.01)

(52) U.S. Cl.
CPC ............ *G06V 30/153* (2022.01); *G06V 20/46* (2022.01); *G06V 20/49* (2022.01); *G06V 30/147* (2022.01)

(58) Field of Classification Search
USPC ....................................................... 382/176
See application file for complete search history.

(56) References Cited

U.S. PATENT DOCUMENTS

| 5,852,435 A | 12/1998 | Vigneaux et al. |
| 11,188,746 B1 | 11/2021 | Patel et al. |
| 11,580,737 B1 | 2/2023 | Miller-Smith et al. |

(Continued)

FOREIGN PATENT DOCUMENTS

| CN | 114494951 A | 5/2022 |
| WO | 2015073501 A2 | 5/2015 |

(Continued)

OTHER PUBLICATIONS

Zhu, Xingquan, et al. "ClassMiner: Mining Medical Video Content Structure and Events Towards Efficient Access and Scalable Skimming." BMKD. 2002. (Year 2002).*

(Continued)

*Primary Examiner* — Darryl V Dottin
(74) *Attorney, Agent, or Firm* — Young Basile Hanlon & MacFarlane, P.C.

(57) ABSTRACT

Methods and systems provide for resolution-based extraction of textual content. In one embodiment, the system receives video content of a communication session with participants. The system then extracts high-resolution versions and low-resolution versions of frames from the video content, and classifies the low-resolution frames of the video content based on identifying text within the low-resolution frames. The system identifies one or more low-resolution distinguishing frames containing text. For each low-resolution distinguishing frame containing text, the system detects a title within the frame, crops a title area with the title within the frame, and extracts, via optical character recognition ("OCR"), the title from the cropped title area of the high-resolution version of the frame. The system extracts, via OCR, textual content from the high-resolution versions of the low-resolution distinguishing frames containing text, and then transmits the extracted textual content and extracted titles to one or more client devices.

20 Claims, 13 Drawing Sheets

(56) References Cited

U.S. PATENT DOCUMENTS

| | | |
|---|---|---|
| 11,849,196 B2 | 12/2023 | Parmar et al. |
| 11,915,429 B2 * | 2/2024 | Vartakavi ................. G06T 7/11 |
| 2002/0145622 A1 | 10/2002 | Kauffman et al. |
| 2004/0216173 A1 | 10/2004 | Horoszowski et al. |
| 2009/0116695 A1 | 5/2009 | Anchyshkin et al. |
| 2010/0164836 A1 | 7/2010 | Liberatore |
| 2010/0165081 A1 | 7/2010 | Jung et al. |
| 2011/0081075 A1 | 4/2011 | Adcock et al. |
| 2014/0099034 A1 * | 4/2014 | Rafati .................... G06V 20/47 |
| | | 382/209 |
| 2016/0247024 A1 | 8/2016 | Loui et al. |
| 2019/0384965 A1 | 12/2019 | Rodriguez et al. |
| 2021/0076105 A1 | 3/2021 | Parmar et al. |
| 2021/0210097 A1 | 7/2021 | Diamant et al. |
| 2022/0051011 A1 * | 2/2022 | Patel .................. G06Q 30/0222 |
| 2023/0394854 A1 | 12/2023 | Polavaram et al. |

FOREIGN PATENT DOCUMENTS

| | | |
|---|---|---|
| WO | 2021051024 A1 | 3/2021 |
| WO | 2022031283 A1 | 2/2022 |

OTHER PUBLICATIONS

International Search Report and Written Opinion mailed on Sep. 12, 2023 in corresponding PCT Application No. PCT/US2023/024304.
Honglin Li et al: "Hierarchical Segmentation of Presentation Videos through Visual and Text Analysis", Signal Processing and Information Technology, 2006 IEEE International Symposium On, IEEE, PI, Aug. 1, 2006 (Aug. 1, 2006), pp. 314-319, XP031002446, ISBN: 978-0-7803-9753-8 the whole document.
Zhu, Xingquan, et al. "ClassMiner: Mining Medical Video Content Structure and Events Towards Efficient Access and Scalable Skimming." DMKD. 2002. (Year: 2002).

* cited by examiner timestamp: 0
title: Welcome to All Hands
texts:
    text_0: Welcome to All Hands
    text_1: April 2, 2020
    text_2: zoom

FIG. 3B timestamp: 1706
title: Requests for:
texts:
  text_0: Requests for:
  text_1: Home office set-up stipend
  text_2: Reimbursement for in-home gym equipment
  text_3: Lunch stipend
  text_4: 2020-04-02 09:30:47

FIG. 3D

RESOLUTION-BASED EXTRACTION OF TEXTUAL CONTENT FROM VIDEO OF A COMMUNICATION SESSION

FIELD OF INVENTION

The present invention relates generally to digital communication, and more particularly, to systems and methods for providing extraction of textual content from video of a communication session.

SUMMARY

The appended claims may serve as a summary of this application.

BRIEF DESCRIPTION OF THE DRAWINGS

The present invention relates generally to digital communication, and more particularly, to systems and methods for providing extraction of textual content from video of a communication session.

The present disclosure will become better understood from the detailed description and the drawings, wherein:

FIG. 3B is a diagram illustrating one example embodiment of an extracted title and extracted textual content from a distinguishing frame containing text.

FIG. 3D is a diagram illustrating one example embodiment of an extracted title and extracted textual content from a distinguishing frame containing text.

DETAILED DESCRIPTION

Figure 1A:
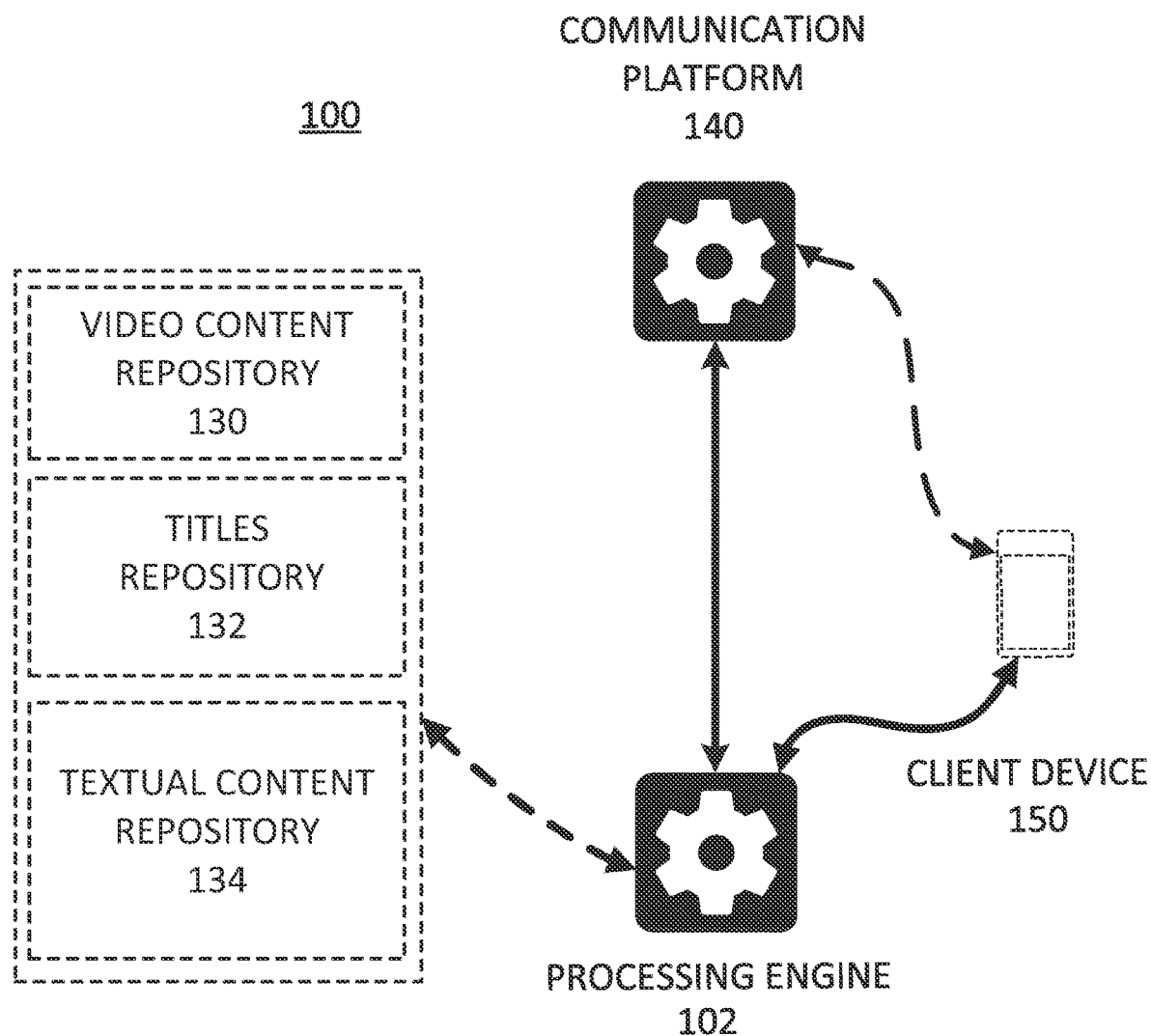
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, when navigating through recorded video of a communication session, reviewing a sales meeting can be difficult and time consuming, as sales meeting can often run for 30-60 minutes, and a large amount of time is often spent on scrolling through the meeting to find the portion or topic the user is looking for. Additionally, past sales meetings can be difficult to search for, as there is no way to search for specific content, including titles of presentation slides and textual content presented in presentation slides.

Thus, there is a need in the field of digital communication tools and platforms to create a new and useful system and method for providing extraction of textual content from video of a communication session. The source of the problem, as discovered by the inventors, is a lack of ability to have textual content automatically extracted from video content (e.g., a video recording) of a communication session.

In one embodiment, the system receives video content of a communication session which includes a number of participants. The system then extracts frames from the video content, and classifies the frames of the video content containing text. The system identifies one or more distinguishing frames containing text. For each distinguishing frame containing text, the system detects a title within the frame, crops a title area with the title within the frame, and extracts, via optical character recognition ("OCR"), the title from the cropped title area of the frame. The system extracts, via OCR, textual content from the distinguishing frames containing text, and then transmits the extracted textual content and extracted titles to one or more client devices.

In another embodiment directed to video frame type classification, the system receives video content of a communication session with a number of participants; extracts frames from the video content; classifies the frames of the video content based on image analysis; and transmits, to one or more client devices, the classification of the frames of the video content.

In another embodiment directed to title detection for presented slides, the system receives video content of a communication session with a number of participants; extracts frames from the video content; classifies the frames of the video content; identifies one or more distinguishing frames containing a presentation slide; for each distinguishing frame containing a presentation slide, detects a title within the frame; and transmits, to one or more client devices, the titles for each of the distinguishing frames comprising a presentation slide.

In another embodiment directed to resolution-based extraction of textual content, the system receives video content of a communication session which includes a number of participants. The system then extracts high-resolution versions and low-resolution versions of frames from the video content, and classifies the low-resolution frames of the video content based on identifying text within the low-resolution frames. The system identifies one or more low-resolution distinguishing frames containing text. For each low-resolution distinguishing frame containing text, the system detects a title within the frame, crops a title area with the title within the frame, and extracts, via optical character recognition ("OCR"), the title from the cropped title area of the high-resolution version of the frame. The system extracts, via OCR, textual content from the high-resolution versions of the low-resolution distinguishing frames containing text, and then transmits the extracted textual content and extracted titles to one or more client devices.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a video content repository 130, titles repository 132, and/or textual content repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

In an embodiment, the processing engine 102 may perform the exemplary method of FIG. 2 or other method herein and, as a result, provide extraction of textual content from video for a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a video content repository 130, title repository 132, and/or textual content repository 134. The optional repositories function to store and/or maintain, respectively, video content for the communication session; extracted titles from frames of the video content; and extracted textual content from frames of the video content. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
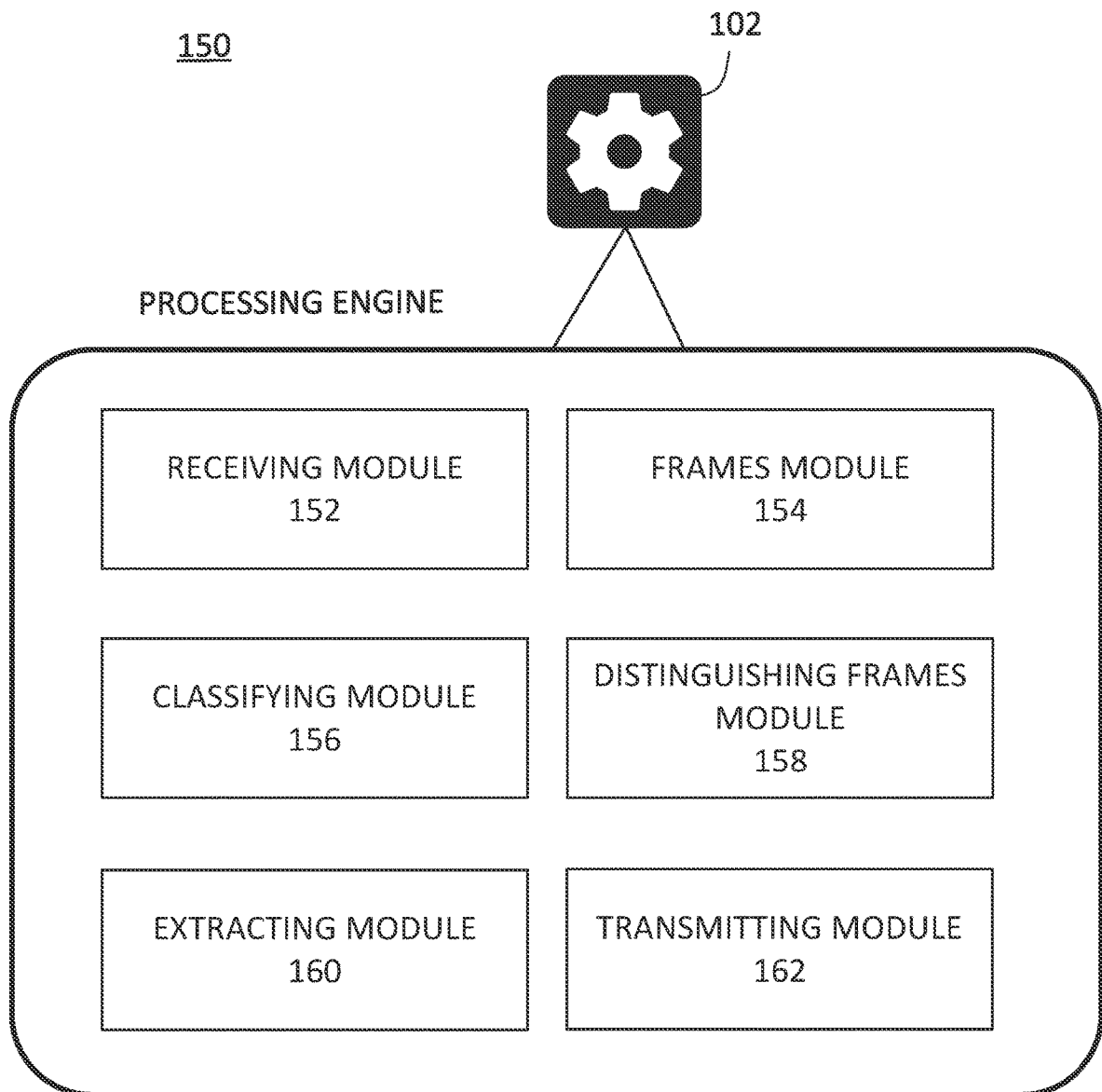
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive video content of a communication session which includes a number of participants.

Frames module 154 functions to extract frames from the video content.

Classifying module 156 functions to classify frames of the video content.

Distinguishing module 158 functions to identify one or more distinguishing frames containing text. For each distinguishing frame containing text, the system detects a title within the frame and crops a title area with the title within the frame.

Extracting module 160 functions to extract, via OCR, the title from the cropped title area of the frame. The system also functions to extract, via OCR, textual content from the distinguishing frames containing text.

Transmitting module 162 functions to transmit the extracted textual content and extracted titles to one or more client devices.

The above modules and their functions will be described in further detail in relation to an exemplary method below.

Figure 2A:
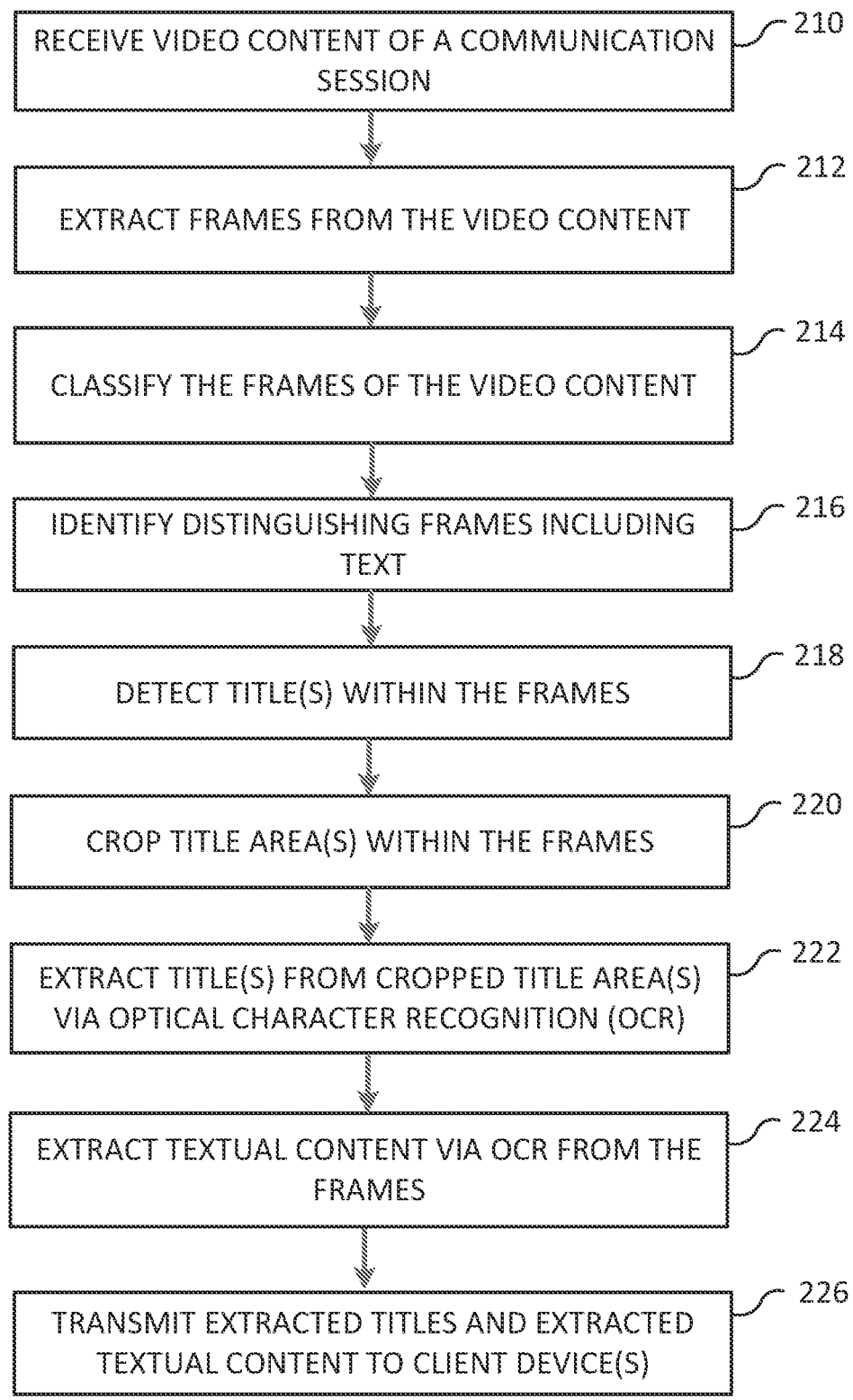
FIG. 2A is a flow chart illustrating an exemplary method of extraction of textual content that may be performed in some embodiments.

FIG. 2A is a flow chart illustrating an exemplary method that may be performed in some embodiments.

At step 210, the system receives video content of a communication session which includes a number of participants. In various embodiments, a communication session may be, e.g., a remote video session, audio session, chat session, or any other suitable communication session between participants. In some embodiments, the communication session can be hosted or maintained on a communication platform, which the system maintains a connection to in order to connect to the communication session. In some embodiments, the system displays a user interface ("UI") for each of the participants in the communication session. The UI can include one or more participant windows or participant elements corresponding to video feeds, audio feeds, chat messages, or other aspects of communication from participants to other participants within the communication session.

The video content the system receives is any recorded video content that captures the communication session. The video content can include any content that is shown within the communication session, including, e.g., video feeds showing participants, presentation slides which are presented during the session, screens, desktops, or windows which are shared, annotations, or any other suitable content which can be shared during a communication session. The video content is composed of a multitude of frames. In some embodiments, the system receives the video content from a client device which was used by a participant to connect to the communication session. In some embodiments, the video content is generated by a client device, or the system itself, during and/or after the communication session. In some embodiments, video content of a session may be recorded upon a permitted participant, such as a host of the session, selecting one or more "record" options from their user interface. In other embodiments, the video content may be recorded automatically based on a user's preferences.

At step 212, the system extracts frames from the video content. In some embodiments, extracting frames from the video content includes extracting high-resolution versions of the frames and low-resolution versions of the frames. The different versions of the frames may be used for achieving speed and efficiency in the text extraction process. For example, low-resolution frames may be processed and analyzed, and high-resolution frames may be used for extraction of text.

In some embodiments, extracting frames involves the system generating a thumbnail for each frame, with the thumbnail being used as the frame for the purposes of this method. In some embodiments, an asynchronous thumbnail extraction service may be queried, and may function to generate individual thumbnail frames, then downsize them (for example, the service may downsize the frame by 10 times). The thumbnail extraction service may further aggregate the individual thumbnail frames into tiles (for example, to a grid of 5×5 tiles). In some embodiments, the resulting thumbnails may then be uploaded to an image server, where they can then be retrieved for further processing.

At step 214, the system classifies frames of the video content. In some embodiments, a frame classifier may be used. By classifying video frames into a number of categories, e.g., 4 categories, consecutively-same frames of video can be grouped within a single segment. In some embodiments, the categories may include black frames (i.e., empty or devoid of content), face frames (i.e., frames where faces of participants are shown via their respective video feeds), slide frames (i.e., frames in which presentation slides are being presented), and demo frames (i.e., frames where a demonstration of a product, technique, or similar is being presented). Face frames may be used to analyze the sentiment and/or engagement of participants. Slide and demo frames may be used to analyze, for example, the duration of product demonstrations in a sales meeting. Slide and demo frames which contain text may also be used for various natural language parsing projects after OCR is performed, among other things. Examples of such frame classifications are described below with respect to FIG. 4.

In some embodiments, a neural network may be used to classify the frames of the video content. In some embodiments, a convolutional neural network (CNN) may be used. Such convolutional neural networks have the advantage of being relatively high-accuracy and lightweight. In some embodiments, using convolutional techniques, different sizes of convolutional kernels may be used, e.g., 1×1, 3×3, or 5×5. Different levels of the inception field may be obtained using these differing sizes. Thus, 1×1 convolutions, 3×3 convolutions, 5×5 convolutions, and so on may be performed, thus increasing the depth and width of the network. In some embodiments, at the final stage of the process, a number of different classification types may be accommodated, such as, e.g., 4 classification types (for example, the 4 types of frames describes above). The values can then be calculated for incoming frames.

In some embodiments, such a convolutional model can be trained prior to performing the classification. A dataset may be used, such as a dataset containing, for example, 100,000 frames which are each labeled manually for one or more parameters. In this example, the frames can be labeled by one of 4 frame types. The model can then be trained on this dataset to be able to predict classification types, given incoming frames of video content.

At step 216, the system identifies one or more distinguishing frames containing text. The identification process involves finding a distinguishing frame, or key frame, which indicates new or changed content in comparison to its previous neighboring frame. In the case of a slide frame, the distinguishing frame can be a new presentation slide, or a same presentation slide with new content. Since demos and slide presentations within communication sessions are mostly static in nature, any major change between two neighboring frames can be assumed to indicate a new slide for which text must be extracted. By only extracting text relating to distinguishing frames rather than all frames, computational speed and efficiency can drastically increase.

In various embodiments, multiple steps may be involved in identifying distinguishing frames. First, frames extracted from previous steps are used as input. In some embodiments, one or more elements, such as a thumbnail of a participant's video feed in the upper right corner, can be removed by padding the area with, for example, a black rectangle. In some embodiments, the system can then invert the frame's colors. Thus, the text within the frame may turn from black to white, for example. In a following step, the system can calculate the difference in the image between two neighboring frames. After this subtraction is performed, the resulting background (i.e., the shared aspects between two neighboring frames) will be black. If two neighboring frames are the same or very similar, the resulting difference in the image will be black or primarily black. However, a differing part, such as new text, will remain. In some cases, the new text will be white due to the previous inversion step. In some embodiments, the system then finds the distinguishing frames, defined as the frames with new content. The system may automatically identify such distinguishing frames by running a value (e.g., 0-255) summation along the x- and y-axis, thus obtaining values given a predefined threshold.

In some embodiments, the system initially filters out frames which are classified as a black frame or a face frame during this process. This filtering is performed because such frame types do not typically contain meaningful or relevant text for purposes of textual extraction. In some embodiments, the system filters out frames which do not contain text, or filters out frames which cannot be distinguished from neighboring frames based on the content of the frame, which can be determined in various ways, including, e.g., machine vision or assumptions about frame classification types.

At step 218, for each distinguishing frame containing text, the system detects a title within the frame. In other words, the system detects that a title is present within the frame. At this step, the system does not yet extract the title from the frame, but rather verifies that there is title text present. Thus, the system must recognize which text is the title within a frame containing text. Title detection is an object detection problem, which involves the task of detecting instances of objects of a certain class within a given image. In some embodiments, one-stage methods may be used which prioritize inference speed, such as, e.g., a You Only Look Once ("YOLO") model. In some embodiments, two-stage methods may be used which prioritize detection accuracy, such as, e.g., Faster R-CNN. A YOLO model approach to title detection is described further below.

In some embodiments, detecting the title within the frame includes a first step of dividing the frame into one or more grids of residual blocks. Residual blocks ca be used to create grids in the particular image, such as, for example, 7×7 grids of residual blocks. Each of these grids acts as central points and a particular prediction for each of these grids is performed accordingly. In some embodiments, detecting the title within the frame includes a second step of generating one or more segregated bounding boxes within the grids of residual blocks. Each of the central points for a particular prediction is considered for the creation of the bounding boxes. While the classification tasks work well for each grid, the bounding boxes must be segregating for each of the predictions that are made. In some embodiments, detecting the title within the frame includes a third step of determining, via intersection of union (IOU) techniques, a top bounding box with highest prediction confidence for the title from the segregated bounding boxes. In some embodiments, this model is trained on a dataset of frames, containing a manually labeled bounding box for each frame.

In some embodiments, the title detection is based on one or more title detection rules. In some embodiments, one or more candidate titles are to be determined prior to determining the title, and one of the title detection rules includes determining that the number of candidate titles determined for the frame does not exceed a threshold number of candidate titles. In some embodiments, one of the title detection rules includes determining that the font size for the title meets or exceeds a threshold ratio of font size relative to other text within the frame. In some embodiments, one of the title detection rules includes determining that the position of the title within the frame matches with one or more prespecified title positions. Such prespecified title positions may include, for example, one or more of: center, left, and top title positions corresponding to areas of the frame.

In some embodiments, detecting the title within the frame comprises use of one or more artificial intelligence ("AI") models, such as, for example, machine learning models, neural networks, machine vision models, or any other suitable AI models.

In some embodiments, the system determines a layout analysis of each distinguishing frame comprising text. In some embodiments, determining the layout analysis involves classifying a plurality of areas of the frame into one or more of: text, title, table, image, and list areas. In some embodiments, determining the layout analysis involves one or more deep neural network techniques. In some embodiments, determining the layout analysis involves one or more image processing techniques. Layout analysis involves building a model or knowledge representation that holds some data involving placement of constituent elements within a frame. In some embodiments, a pipeline for layout analysis may be achieved using a combination of deep neural networks and image processing techniques to achieve this task. In some embodiments, such an approach is capable of handling different types of frames, and is capable of potentially handling complex backgrounds. In various embodiments, one or more steps may involve deep learning based image, text, and icon detection; comparison of vision-based and deep learning-based approaches for text extraction; and grid identification as well as block rectification.

At step 220, the system crops a title area with the title within the frame. In various embodiments, any suitable method of cropping an image to a specified area may be used. IN some embodiments, the system crops the title area to the detected bounding box from the previous step. In some embodiments, such a cropping may not be strictly or precisely limited to just the title, but may include other elements of the frame.

At step 222, the system extracts, via OCR, the title from the cropped title area of the frame. OCR is a technology that is designed to recognize text within an image. In this case, an OCR model is used to extract the title text from the cropped title area. In various embodiments, OCR-based text extraction may involve such techniques as, e.g., feature extraction, matrix matching, layout analysis, iterative OCR, lexicon-based OCR, near-neighbor analysis, binarization, character segmentation, normalization, or any other suitable techniques related to OCR.

At step 224, the system extracts, via OCR, textual content from the distinguishing frames containing text. Once the titles have been extracted from particular distinguishing frames containing text, then the system can proceed to capture the textual content in full from such frames. The same or different OCR-based text extraction techniques may apply, depending on various embodiments.

At step 226, the system transmits the extracted titles and extracted textual content to one or more client devices. In some embodiments, prior to transmitting the titles and textual content to the client devices, the system formats them. In some embodiments, they are formatted into a structured data markup format, such as, e.g., JSON format. In some embodiments, they are structured to be presented towards various usages, such as, for example, search results formatting, analytics data formatting, and more.

Figure 2B:
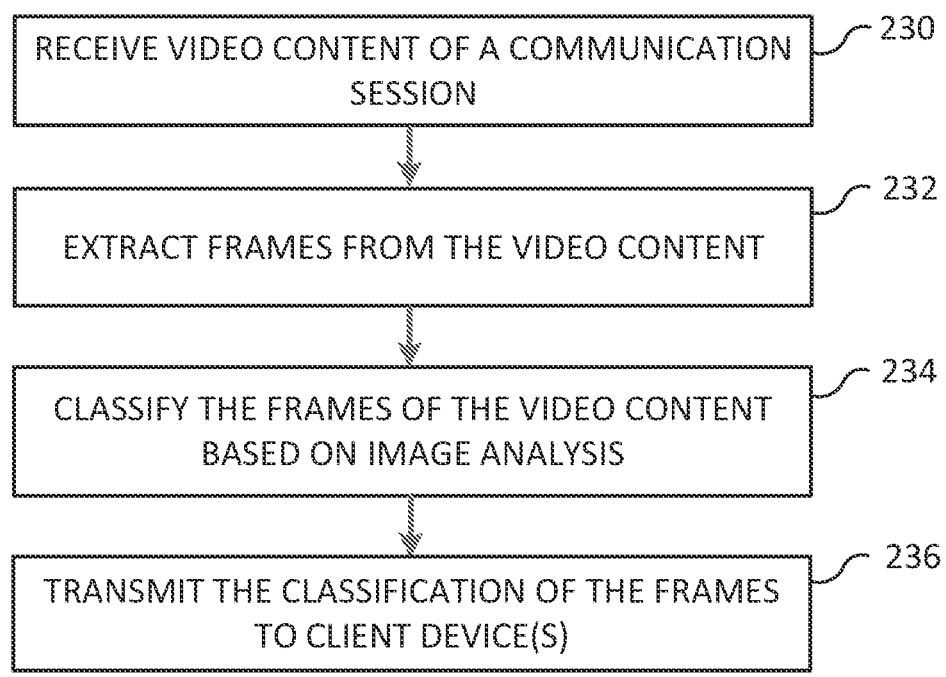
FIG. 2B is a flow chart illustrating an exemplary method video frame type classification that may be performed in some embodiments.

FIG. 2B is a flow chart illustrating an exemplary method video frame type classification that may be performed in some embodiments.

At step 230, the system receives video content of a communication session comprising a plurality of participants, as described above with respect to FIG. 2A.

At step 232, the system extracts frames from the video content, as described above with respect to FIG. 2A.

At step 234, the system classifies the frames of the video content based on image analysis, as described above with respect to FIG. 2A. In some embodiments, the frames of the video content may be classified as one or more of: a black frame, a face frame, a slide frame, and a demo frame.

In some embodiments, classifying the frames of the video content can be performed using a CNN. In some embodiments, the system further includes post-processing of the frames based on the classification of the frames. This may include, in some embodiments, determining a time between two neighboring frames that does not meet a length threshold; and removing noise between the two neighboring frames. This may be known as a "smoothing" post-processing step. In some embodiments, the system may determine one or more differences in the classification of the neighboring frames. For example, the frames of the video content may be showing face-to-face chatting between participants for some time, then switch to a slide presentation, then switch to a demonstration of a product. In some embodiments, the system may segment the communication session into separate topic segments based on the determined differences in the classification in neighboring frames. Thus, one segment may be generated for the face-to-face chatting, another for the slide presentation, another for the demonstration of the product, and so on. In some embodiments, the system may present a visual indication of these differences, such as a chart or graph of the differences from beginning of the video content to end of the video content.

At step 236, the system transmits, to one or more client devices, the classification of the frames of the video content, as described above with respect to FIG. 2A.

Figure 2C:
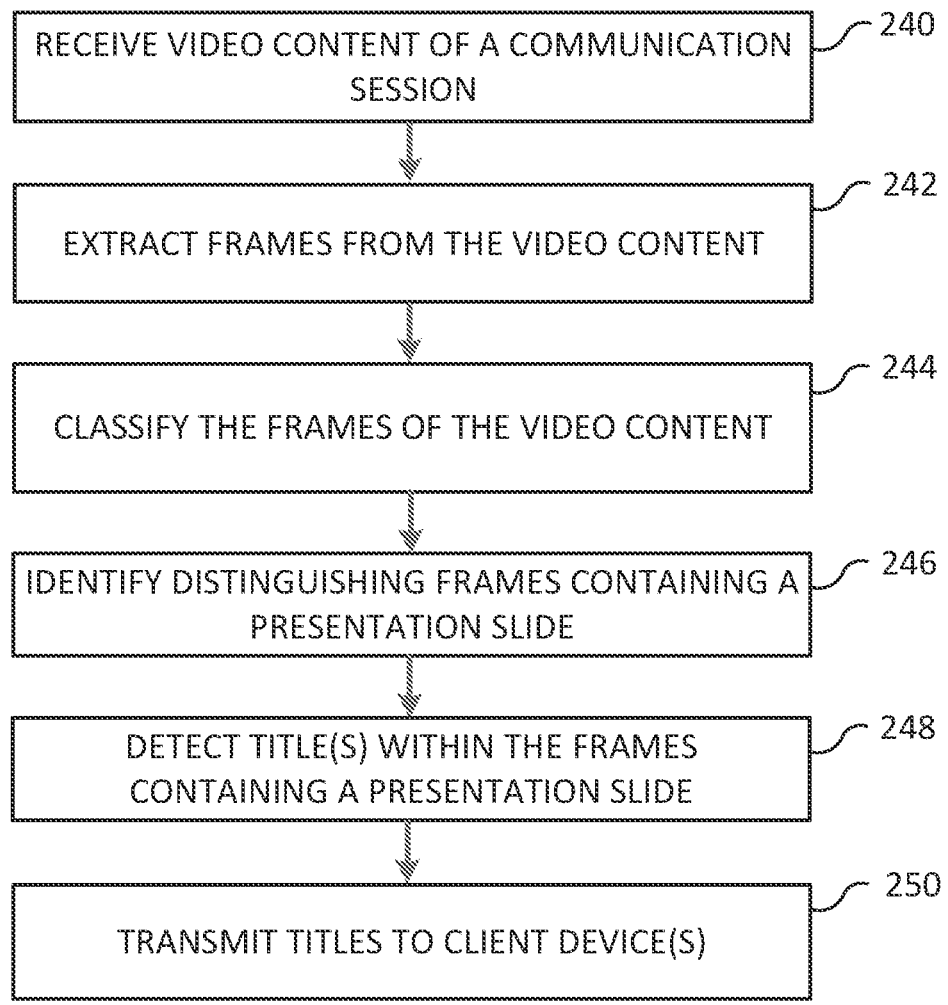
FIG. 2C is a flow chart illustrating an exemplary method of title detection for presented slides that may be performed in some embodiments.

FIG. 2C is a flow chart illustrating an exemplary method of title detection for presented slides that may be performed in some embodiments.

At step 240, the system receives video content of a communication session containing a number of participants, as described above with respect to FIG. 2A.

At step 242, the system extracts frames from the video content; as described above with respect to FIG. 2A.

At step 244, the system classifies the frames of the video content, as described above with respect to FIG. 2A.

At step 246, the system identifies one or more distinguishing frames containing a presentation slide; as described above with respect to FIG. 2A.

At step 248, for each distinguishing frame comprising a presentation slide, the system detects a title within the frame, as described above with respect to FIG. 2A.

At step 250, the system transmits, to one or more client devices, the titles for each of the distinguishing frames containing a presentation slide. In some embodiments, information about the bounding boxes of the titles are also transmitted. The information about the bounding boxes may be transmitted in the form of, e.g., the location of the bounding box within the frame, pixel locations or coordinates, dot-per-inch (DPI) dimensions, or a ratio pertaining to a relative location of the bounding box, such as, for example, two-thirds of the way in and one-third of the way down from the top left corner of the frame.

Figure 2D:
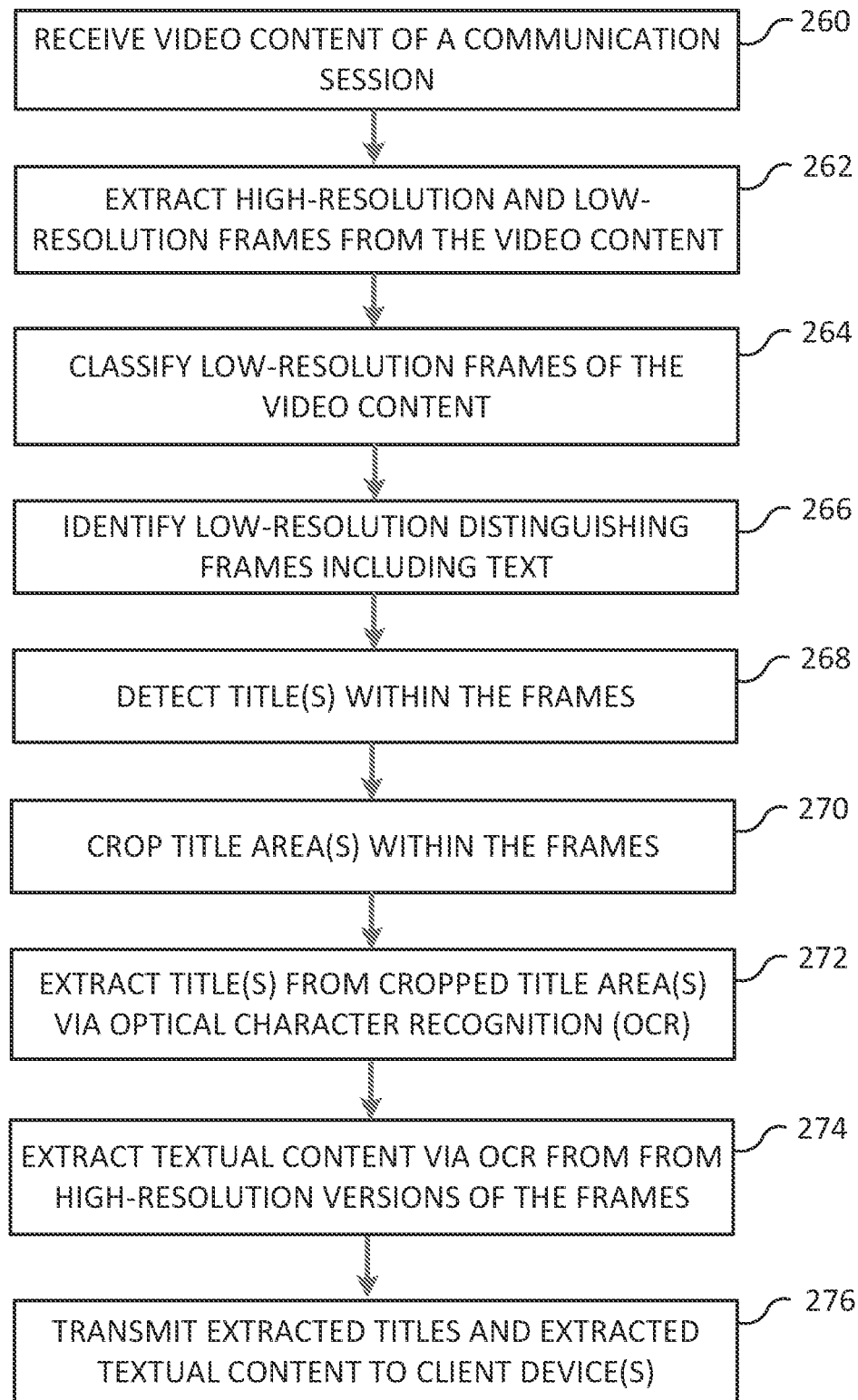
FIG. 2D is a flow chart illustrating an exemplary method of resolution-based extraction of textual content that may be performed in some embodiments.

FIG. 2D is a flow chart illustrating an exemplary method of resolution-based extraction of textual content that may be performed in some embodiments.

At step 260, the system receives video content of a communication session with a number of participants, as described above with respect to FIG. 2A.

At step 262, the system extracts high-resolution versions and low-resolution versions of frames from the video content, as described above with respect to FIG. 2A. In some embodiments, the high-resolution versions and low-resolution versions may capture different resolutions of the same content. Computational speeds for extracting text are different when performing processing with different frame resolutions. With low-resolution frames rather than high-resolution frames, the difference can often be significant. However, while the task of deciding which frames should have OCR extraction conducted on them is suitable to be performed on low-resolution frames, OCR extraction itself is not suitable for low-resolution frames, as a significant amount of visual information will be lost which lowers too much accuracy of OCR extraction to be useful. In some embodiments with a hybrid high-resolution/low-resolution method, both resolutions can be leveraged in different ways to provide speed but also accuracy, as described further below.

At step 264, the system classifies the low-resolution frames of the video content, as described above with respect to FIG. 2A. In some embodiments, the classification step can be performed using low-resolution frames, resulting in an increase in speed but not a decrease in accuracy.

At step 266, the system identifies one or more low-resolution distinguishing frames containing text, as described above with respect to FIG. 2A. In some embodiments, the identification of distinguishing frames can be performed using low-resolution frames, without a loss of accuracy.

At step 268, for each low-resolution distinguishing frame containing text, the system detects a title within the frame, as described above with respect to FIG. 2A.

At step 270, the system crops a title area with the title within the frame, as described above with respect to FIG. 2A.

At step 272, the system extracts, via optical character recognition (OCR), the title from the cropped title area of the high-resolution version of the frame, as described above with respect to FIG. 2A. In some embodiments, a timestamp for the low-resolution distinguishing frame is used to locate the corresponding high-resolution distinguishing frame at the same timestamp. The OCR title extraction step is then performed on the high-resolution frame with identical content.

At step 274, the system extracts, via OCR, textual content from the high-resolution versions of the low-resolution distinguishing frames comprising text, as described above with respect to FIG. 2A. In some embodiments, as in the previous step, a timestamp for the low-resolution distinguishing frame is used to locate the corresponding high-resolution distinguishing frame at the same timestamp. The OCR textual content extraction step is then performed on the high-resolution frame with identical content.

At step 276, the system transmits, to one or more client devices, the extracted textual content and the extracted titles, as described above with respect to FIG. 2A.

Figure 3A:
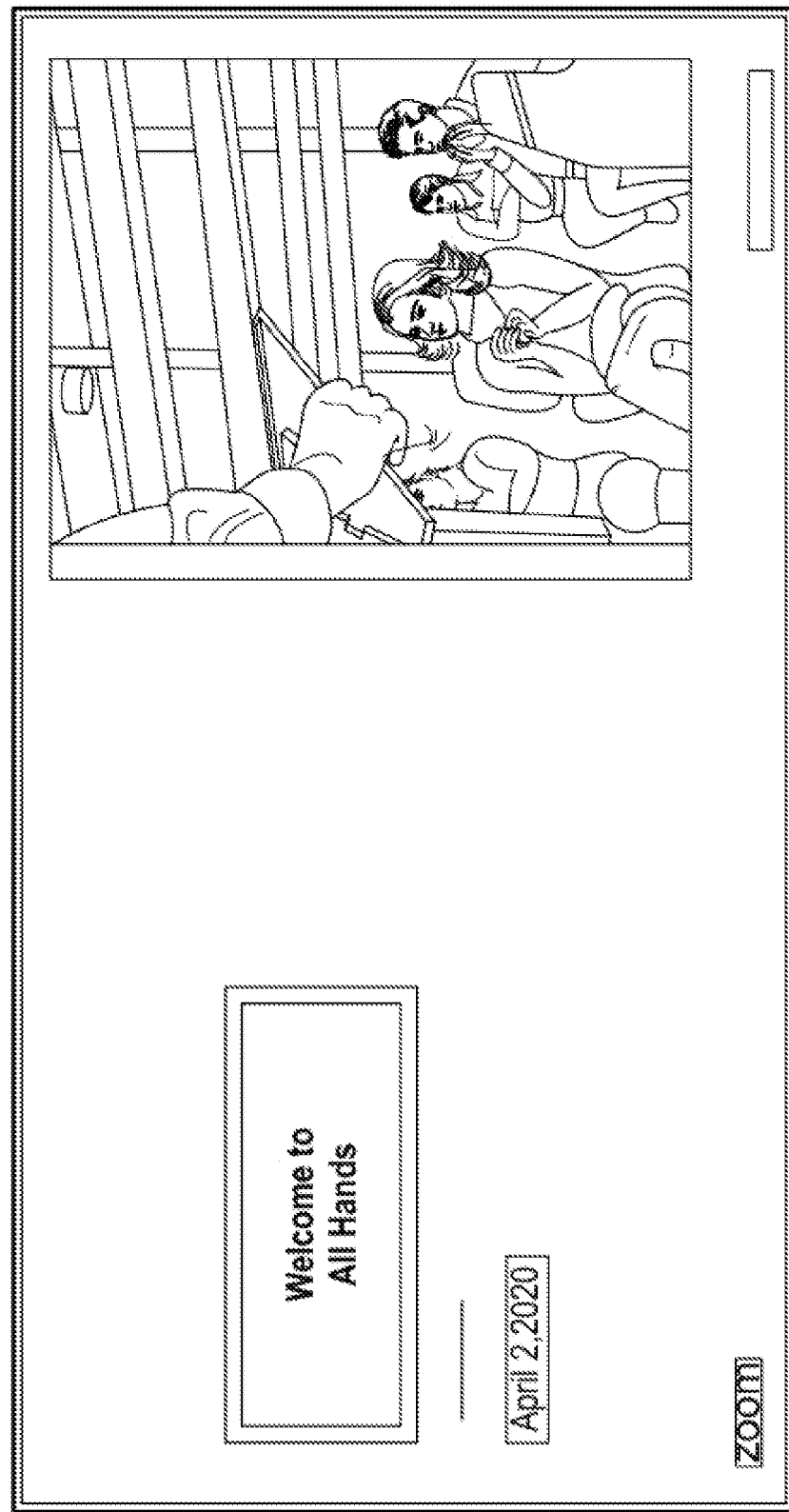
FIG. 3A is a diagram illustrating one example embodiment of a distinguishing frame containing text.

FIG. 3A is a diagram illustrating one example embodiment of a distinguishing frame containing text. As described above with respect to FIG. 2A, textual content may be extracted from one or more frames of the video content. In the illustrated example, a presentation slide is shown. A title area is present, with a title that reads, "Welcome to All Hands". A date and company name are further provided below the title.

FIG. 3B is a diagram illustrating one example embodiment of an extracted title and extracted textual content from a distinguishing frame containing text.

The presentation slide illustrated in FIG. 3A has had its text extracted using one or more processes described above with respect to FIG. 2A. The extracted text includes an extracted title, timestamp associated with the frame of the video content, and three separate pieces of textual content that have been extracted.

Figure 3C:
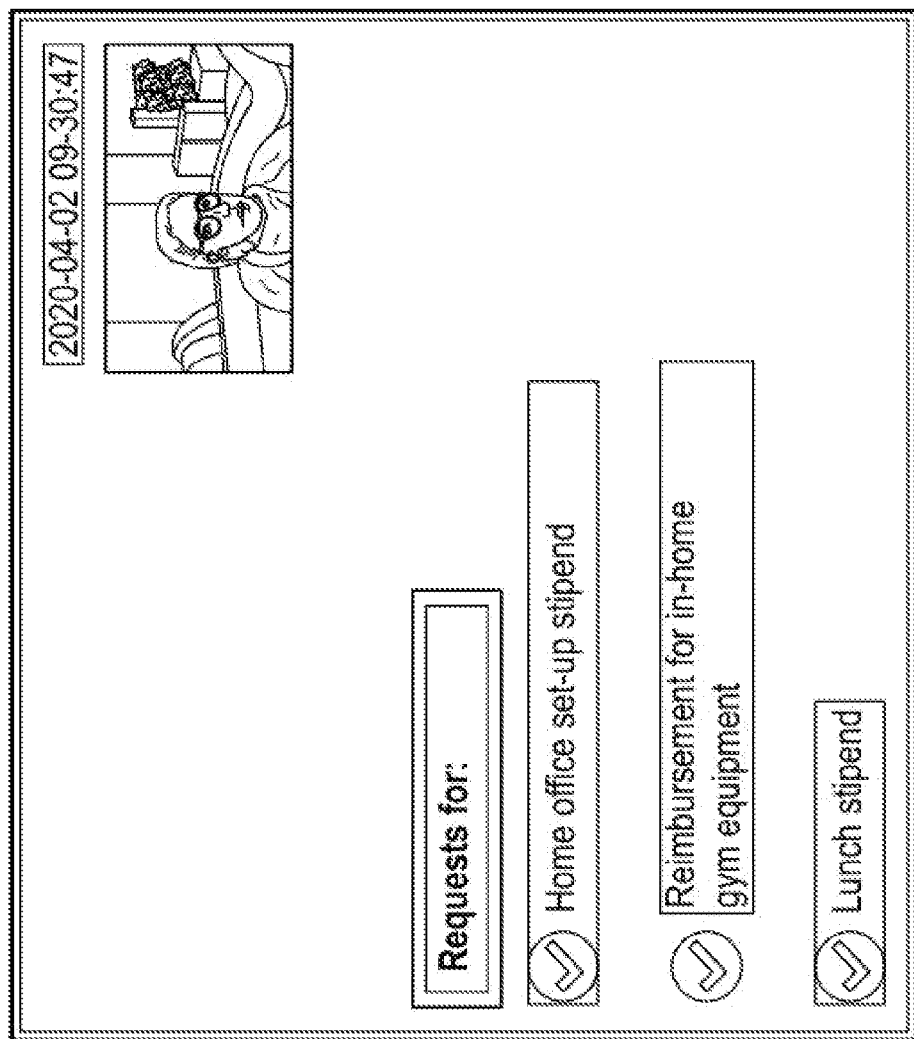
FIG. 3C is a diagram illustrating one example embodiment of a distinguishing frame containing text.

FIG. 3C is a diagram illustrating one example embodiment of a distinguishing frame containing text. In the illustrated example of a frame, a title is identified as "Requests for:" and a bounding box is generated around the title. Although a date is displayed in the top left corner, it is not recognized as a title. In some embodiments, the date and/or the thumbnail of the video feed in the top right corner are replacing with padding of a black rectangle.

FIG. 3D is a diagram illustrating one example embodiment of an extracted title and extracted textual content from a distinguishing frame containing text. The frame illustrated in FIG. 3C has its title and textual content extracted, which is presented along with a timestamp for the frame.

Figure 3E:
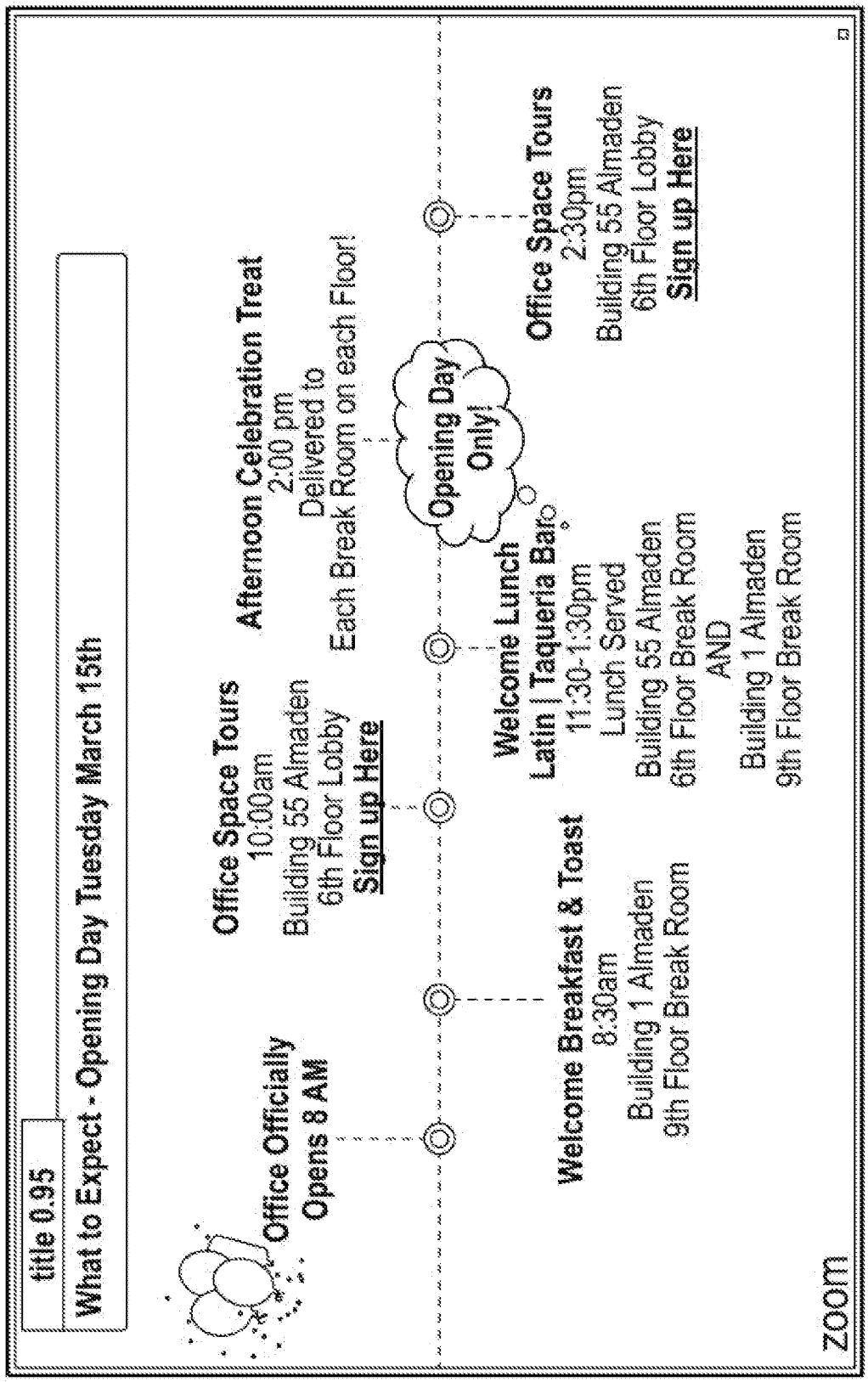
FIG. 3E is a diagram illustrating one example embodiment of a distinguishing frame containing text.

FIG. 3E is a diagram illustrating one example embodiment of a distinguishing frame containing text. The illustrated example shows a frame in which a title has been detected. Although there are potentially some complex aspects within the frame, the process still successfully detects a title, generates a bounding box around the title, and extracts the title via OCR.

Figure 4:
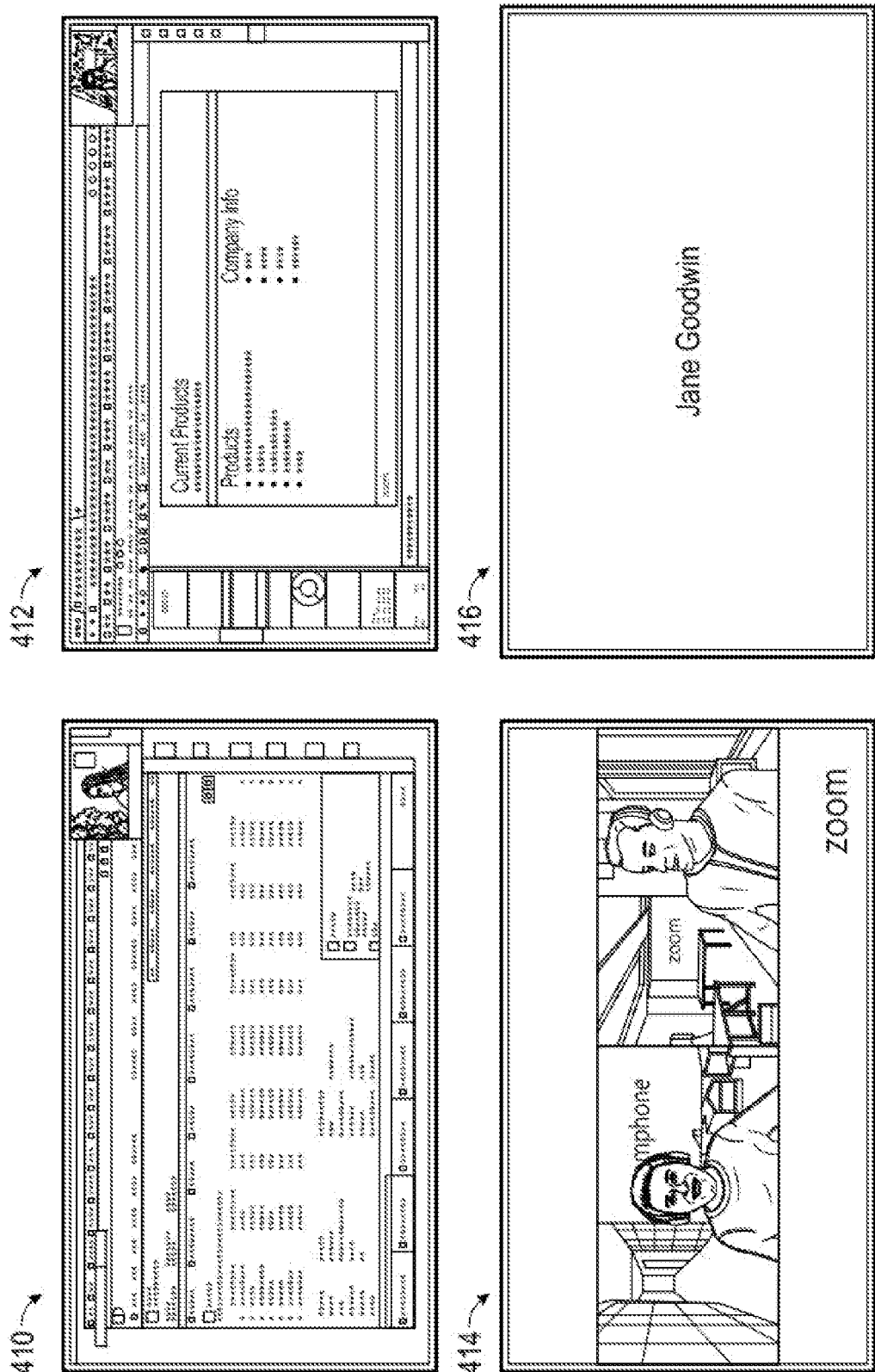
FIG. 4 is a diagram illustrating example embodiments of frames of video content with differing classifications.

FIG. 4 is a diagram illustrating example embodiments of frames of video content with differing classifications.

The four examples of frames illustrated depict four different classification types for frames. Such types may be classified by a frame classifier, as described above with respect to FIG. 2. Frame 410 is a demo frame, wherein one person is sharing their screen or desktop. In this frame, the person may be demonstrating or introducing a product or technique, for example. Frame 412 is a slide frame, where one person is sharing slides, using software such as, e.g., Microsoft PowerPoint. Frame 414 is a face frame, wherein no participant is sharing a screen or slides, but rather two participants are shown on camera within their respective video feeds. Frame 416 is a black frame, wherein a person is present in the meeting, but has not enabled their video feed and is not sharing a screen or any slides.

Figure 5:
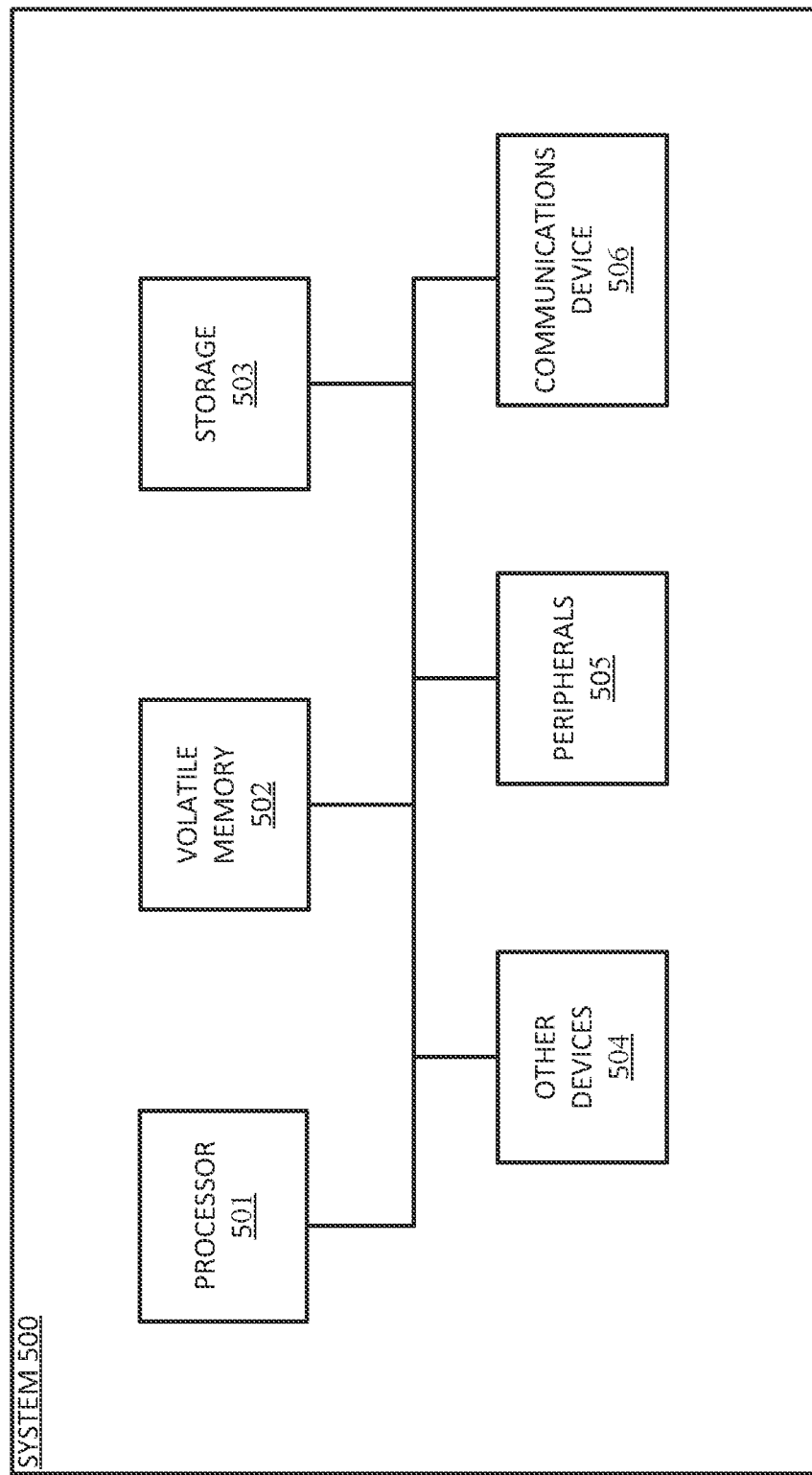
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method, comprising: receiving video content of a communication session comprising a plurality of participants; extracting high-resolution versions and low-resolution versions of frames from the video content; classifying the low-resolution frames of the video content; identifying one or more low-resolution distinguishing frames comprising text; for each low-resolution distinguishing frame comprising text: detecting a title within the frame, cropping a title area with the title within the frame, and extracting, via optical character recognition (OCR), the title from the cropped title area of the high-resolution version of the frame; extracting, via OCR, textual content from the high-resolution versions of the low-resolution distinguishing frames comprising text; and transmitting, to one or more client devices, the extracted textual content and the extracted titles.

Example 2. The method of example 1, wherein extracting the title from the cropped title area of the high-resolution version of the frame comprises: identifying a timestamp corresponding to the low-resolution frame; locating the high-resolution version of the low-resolution frame via the timestamp; and extracting, via OCR, the title from the high-resolution version of the frame.

Example 3. The method of any of examples 1-2, wherein extracting the textual content from the high-resolution versions of the low-resolution distinguishing frames comprising text comprises: identifying timestamps corresponding to each of the low-resolution distinguishing frames comprising text; locating the high-resolution versions of the low-resolution frames via the corresponding timestamps; and extracting, via OCR, the textual content from the high-resolution versions of the low-resolution distinguishing frames.

Example 4. The method of any of examples 1-3, wherein the low-resolution frames of the video content may be classified as one or more of: a black frame, a face frame, a slide frame, and a demo frame.

Example 5. The method of example 4, wherein identifying one or more low-resolution distinguishing frames comprising text comprises: filtering out low-resolution frames which are classified as a black frame or a face frame.

Example 6. The method of any of examples 1-5, wherein identifying one or more low-resolution distinguishing frames comprising text comprises: filtering out low-resolution frames which do not contain text.

Example 7. The method of any of examples 1-6, wherein identifying one or more low-resolution distinguishing frames comprising text comprises: filtering out low-resolution frames which cannot be distinguished from neighboring frames based on the content of the frame.

Example 8. The method of any of examples 1-7, wherein detecting the title within the frame comprises a plurality of You Only Look Once (YOLO) techniques.

Example 9. The method of any of examples 1-8, wherein detecting the title within the frame comprises: dividing the frame into one or more grids of residual blocks.

Example 10. The method of example 7, wherein detecting the title within the frame further comprises: generating one or more segregated bounding boxes within the grids of residual blocks.

Example 11. The method of example 8, wherein detecting the title within the frame further comprises: determining, via intersection of union (IOU) techniques, a top bounding box with highest prediction confidence for the title from the segregated bounding boxes.

Example 12. The method of any of examples 1-11, wherein detecting the title within the frame is based on one or more title detection rules.

Example 13. The method of any of examples 1-12, wherein detecting the title within the frame comprises one or more machine learning algorithms.

Example 14. The method of any of examples 1-13, further comprising: determining a layout analysis of each low-resolution distinguishing frame comprising text.

Example 15. The method of example 12, wherein determining the layout analysis of each low-resolution distinguishing frame comprising text comprises classifying a plurality of areas of the frame into one or more of: text, title, table, image, and list areas.

Example 16. The method of example 12, wherein determining the layout analysis of each low-resolution distinguishing frame comprising text comprises one or more deep neural network techniques.

Example 17. The method of example 12, wherein determining the layout analysis of each low-resolution distinguishing frame comprising text comprises one or more image processing techniques.

Example 18. The method of example 12, wherein determining the layout analysis of each low-resolution distinguishing frame comprising text comprises one or more image processing techniques.

Example 19. A communication system comprising one or more processors configured to perform the operations of: receiving video content of a communication session comprising a plurality of participants; extracting high-resolution versions and low-resolution versions of frames from the video content; classifying the low-resolution frames of the video content; identifying one or more low-resolution distinguishing frames comprising text; for each low-resolution distinguishing frame comprising text: detecting a title within the frame, cropping a title area with the title within the frame, and extracting, via optical character recognition (OCR), the title from the cropped title area of the high-resolution version of the frame; extracting, via OCR, textual content from the high-resolution versions of the low-resolution distinguishing frames comprising text; and transmitting, to one or more client devices, the extracted textual content and the extracted titles.

Example 20. The communication system of example 19, wherein extracting the title from the cropped title area of the high-resolution version of the frame comprises: identifying a timestamp corresponding to the low-resolution frame; locating the high-resolution version of the low-resolution frame via the timestamp; and extracting, via OCR, the title from the high-resolution version of the frame.

Example 21. The communication system of any of examples 19-20, wherein extracting the textual content from the high-resolution versions of the low-resolution distinguishing frames comprising text comprises: identifying timestamps corresponding to each of the low-resolution distinguishing frames comprising text; locating the high-resolution versions of the low-resolution frames via the corresponding timestamps; and extracting, via OCR, the textual content from the high-resolution versions of the low-resolution distinguishing frames.

Example 22. The communication system of any of examples 19-21, wherein the low-resolution frames of the video content may be classified as one or more of: a black frame, a face frame, a slide frame, and a demo frame.

Example 23. The communication system of example 22, wherein identifying one or more low-resolution distinguishing frames comprising text comprises: filtering out low-resolution frames which are classified as a black frame or a face frame.

Example 24. The communication system of any of examples 19-23, wherein identifying one or more low-resolution distinguishing frames comprising text comprises: filtering out low-resolution frames which do not contain text.

Example 25. The communication system of any of examples 19-24, wherein identifying one or more low-resolution distinguishing frames comprising text comprises: filtering out low-resolution frames which cannot be distinguished from neighboring frames based on the content of the frame.

Example 26. The communication system of any of examples 19-25, wherein detecting the title within the frame comprises a plurality of You Only Look Once (YOLO) techniques.

Example 27. The communication system of any of examples 19-26, wherein detecting the title within the frame comprises: dividing the frame into one or more grids of residual blocks.

Example 28. The communication system of example 27, wherein detecting the title within the frame further comprises: generating one or more segregated bounding boxes within the grids of residual blocks.

Example 29. The communication system of example 28, wherein detecting the title within the frame further comprises: determining, via intersection of union (IOU) techniques, a top bounding box with highest prediction confidence for the title from the segregated bounding boxes.

Example 30. The communication system of any of examples 19-29, wherein detecting the title within the frame is based on one or more title detection rules.

Example 31. The communication system of any of examples 19-30, wherein detecting the title within the frame comprises one or more machine learning algorithms.

Example 32. The communication system of any of examples 19-31, further comprising: determining a layout analysis of each low-resolution distinguishing frame comprising text.

Example 33. The communication system of example 32, wherein determining the layout analysis of each low-resolution distinguishing frame comprising text comprises classifying a plurality of areas of the frame into one or more of: text, title, table, image, and list areas.

Example 34. The communication system of example 32, wherein determining the layout analysis of each low-resolution distinguishing frame comprising text comprises one or more deep neural network techniques.

Example 35. The communication system of example 32, wherein determining the layout analysis of each low-resolution distinguishing frame comprising text comprises one or more image processing techniques.

Example 36. The communication system of example 32, wherein determining the layout analysis of each low-resolution distinguishing frame comprising text comprises one or more image processing techniques.

Example 37. A non-transitory computer-readable medium containing instructions comprising: instructions for receiving video content of a communication session comprising a plurality of participants; instructions for extracting high-resolution versions and low-resolution versions of frames from the video content; instructions for classifying the low-resolution frames of the video content; instructions for identifying one or more low-resolution distinguishing frames comprising text; for each low-resolution distinguishing frame comprising text: instructions for detecting a title within the frame, instructions for cropping a title area with the title within the frame, and instructions for extracting, via optical character recognition (OCR), the title from the cropped title area of the high-resolution version of the frame; instructions for extracting, via OCR, textual content from the high-resolution versions of the low-resolution distinguishing frames comprising text; and instructions for transmitting, to one or more client devices, the extracted textual content and the extracted titles.

Example 38. The non-transitory computer-readable medium of example 37, wherein extracting the title from the cropped title area of the high-resolution version of the frame comprises: identifying a timestamp corresponding to the low-resolution frame; locating the high-resolution version of the low-resolution frame via the timestamp; and extracting, via OCR, the title from the high-resolution version of the frame.

Example 39. The non-transitory computer-readable medium of any of examples 37-38, wherein extracting the textual content from the high-resolution versions of the low-resolution distinguishing frames comprising text comprises: identifying timestamps corresponding to each of the low-resolution distinguishing frames comprising text; locating the high-resolution versions of the low-resolution frames via the corresponding timestamps; and extracting, via OCR, the textual content from the high-resolution versions of the low-resolution distinguishing frames.

Example 40. The non-transitory computer-readable medium of any of examples 37-39, wherein the low-resolution frames of the video content may be classified as one or more of: a black frame, a face frame, a slide frame, and a demo frame.

Example 41. The non-transitory computer-readable medium of example 40, wherein identifying one or more low-resolution distinguishing frames comprising text comprises: filtering out low-resolution frames which are classified as a black frame or a face frame.

Example 42. The non-transitory computer-readable medium of any of examples 37-41, wherein identifying one or more low-resolution distinguishing frames comprising text comprises: filtering out low-resolution frames which do not contain text.

Example 43. The non-transitory computer-readable medium of any of examples 37-42, wherein identifying one or more low-resolution distinguishing frames comprising text comprises: filtering out low-resolution frames which cannot be distinguished from neighboring frames based on the content of the frame.

Example 44. The non-transitory computer-readable medium of any of examples 37-43, wherein detecting the title within the frame comprises a plurality of You Only Look Once (YOLO) techniques.

Example 45. The non-transitory computer-readable medium of any of examples 37-44, wherein detecting the title within the frame comprises: dividing the frame into one or more grids of residual blocks.

Example 46. The non-transitory computer-readable medium of example 45, wherein detecting the title within the frame further comprises: generating one or more segregated bounding boxes within the grids of residual blocks.

Example 47. The non-transitory computer-readable medium of example 46, wherein detecting the title within the frame further comprises: determining, via intersection of union (IOU) techniques, a top bounding box with highest prediction confidence for the title from the segregated bounding boxes.

Example 48. The non-transitory computer-readable medium of any of examples 37-47, wherein detecting the title within the frame is based on one or more title detection rules.

Example 49. The non-transitory computer-readable medium of any of examples 37-48, wherein detecting the title within the frame comprises one or more machine learning algorithms.

Example 50. The non-transitory computer-readable medium of any of examples 37-49, further comprising: determining a layout analysis of each low-resolution distinguishing frame comprising text.

Example 51. The non-transitory computer-readable medium of example 50, wherein determining the layout analysis of each low-resolution distinguishing frame comprising text comprises classifying a plurality of areas of the frame into one or more of: text, title, table, image, and list areas.

Example 52. The non-transitory computer-readable medium of example 50, wherein determining the layout analysis of each low-resolution distinguishing frame comprising text comprises one or more deep neural network techniques.

Example 53. The non-transitory computer-readable medium of example 50, wherein determining the layout analysis of each low-resolution distinguishing frame comprising text comprises one or more image processing techniques.

Example 54. The non-transitory computer-readable medium of example 50, wherein determining the layout analysis of each low-resolution distinguishing frame comprising text comprises one or more image processing techniques.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   receiving video content of a communication session comprising a plurality of participants;
   extracting high-resolution versions and low-resolution versions of frames from the video content;
   classifying the low-resolution frames of the video content;
   identifying one or more low-resolution distinguishing frames comprising text;
   for each low-resolution distinguishing frame comprising text:
      detecting a title within the frame,
      cropping a title area with the title within the frame, and
      extracting, via optical character recognition (OCR), the title from the cropped title area of the high-resolution version of the frame;
   extracting, via OCR, textual content from the high-resolution versions and the low-resolution distinguishing frames comprising text; and
   transmitting, to one or more client devices, the extracted textual content and the extracted titles.

2. The method of claim 1, wherein extracting the title from the cropped title area of the high-resolution version of the frame comprises:
   identifying a timestamp corresponding to the low-resolution frame;
   locating the high-resolution version of the low-resolution frame via the timestamp; and
   extracting, via OCR, the title from the high-resolution version of the frame.

3. The method of claim 1, wherein extracting the textual content from the high-resolution versions of the low-resolution distinguishing frames comprising text comprises:
   identifying timestamps corresponding to each of the low-resolution distinguishing frames comprising text;
   locating the high-resolution versions of the low-resolution frames via the corresponding timestamps; and
   extracting, via OCR, the textual content from the high-resolution versions of the low-resolution distinguishing frames.

4. The method of claim 1, wherein the low-resolution frames of the video content may be classified as one or more of: a black frame, a face frame, a slide frame, and a demo frame.

5. The method of claim 4, wherein identifying one or more low-resolution distinguishing frames comprising text comprises:
filtering out low-resolution frames which are classified as a black frame or a face frame.

6. The method of claim 1, wherein identifying one or more low-resolution distinguishing frames comprising text comprises:
filtering out low-resolution frames which do not contain text.

7. The method of claim 1, wherein identifying one or more low-resolution distinguishing frames comprising text comprises:
filtering out low-resolution frames which cannot be distinguished from neighboring frames based on the content of the frame.

8. The method of claim 7, wherein detecting the title within the frame further comprises:
generating one or more segregated bounding boxes within grids of residual blocks.

9. The method of claim 8, wherein detecting the title within the frame further comprises:
determining, via intersection of union (IOU) techniques, a top bounding box with highest prediction confidence for the title from the segregated bounding boxes.

10. The method of claim 1, wherein detecting the title within the frame is based on one or more title detection rules.

11. The method of claim 1, wherein detecting the title within the frame comprises one or more machine learning algorithms.

12. The method of claim 1, further comprising:
determining a layout analysis of each low-resolution distinguishing frame comprising text.

13. The method of claim 12, wherein determining the layout analysis of each low-resolution distinguishing frame comprising text comprises classifying a plurality of areas of the frame into one or more of: text, title, table, image, and list areas.

14. The method of claim 12, wherein determining the layout analysis of each low-resolution distinguishing frame comprising text comprises one or more deep neural network techniques.

15. The method of claim 12, wherein determining the layout analysis of each low-resolution distinguishing frame comprising text comprises one or more image processing techniques.

16. The method of claim 12, wherein determining the layout analysis of each low-resolution distinguishing frame comprising text comprises one or more image processing techniques.

17. A communication system comprising:
one or more processors configured to:
receive video content of a communication session comprising a plurality of participants;
extract high-resolution versions and low-resolution versions of frames from the video content;
classify the low-resolution frames of the video content;
identify one or more low-resolution distinguishing frames comprising text;
for each low-resolution distinguishing frame comprising text:
detect a title within the frame,
crop a title area with the title within the frame, and
extract, via optical character recognition (OCR), the title from the cropped title area of the high-resolution version of the frame;
extract, via OCR, textual content from the high-resolution versions and the low-resolution distinguishing frames comprising text; and
transmit, to one or more client devices, the extracted textual content and the extracted titles.

18. The communication system of claim 17, wherein the low-resolution frames of the video content may be classified as one or more of: a black frame, a face frame, a slide frame, and a demo frame.

19. The communication system of claim 17, wherein the one or more processors are further configured to:
determine a semantic understanding of each low-resolution distinguishing frame comprising text.

20. A non-transitory computer-readable medium containing instructions, that when executed by a processor, cause the processor to perform comprising:
receiving video content of a communication session comprising a plurality of participants;
extracting high-resolution versions and low-resolution versions of frames from the video content;
classifying the low-resolution frames of the video content;
identifying one or more low-resolution distinguishing frames comprising text;
for each low-resolution distinguishing frame comprising text:
detecting a title within the frame,
cropping a title area with the title within the frame, and
extracting, via optical character recognition (OCR), the title from the cropped title area of the high-resolution version of the frame;
extracting, via OCR, textual content from the high-resolution versions of the low-resolution distinguishing frames comprising text; and
transmitting, to one or more client devices, the extracted textual content and the extracted titles.

* * * * *